United States Patent
Zhou et al.

(10) Patent No.: US 12,093,388 B2
(45) Date of Patent: Sep. 17, 2024

(54) MULTIVARIATE MALWARE DETECTION METHODS AND SYSTEMS

(71) Applicant: Huawei Technologies Co., Ltd., Shenzhen (CN)

(72) Inventors: Yang Zhou, Kanata (CA); Ronnie Salvador Giagone, Kanata (CA); Ibrahim AbuAlhaol, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 170 days.

(21) Appl. No.: 17/321,280

(22) Filed: May 14, 2021

(65) Prior Publication Data

US 2022/0366047 A1 Nov. 17, 2022

(51) Int. Cl.
| | | |
|---|---|---|
| H04L 29/06 | (2006.01) | |
| G06F 21/56 | (2013.01) | |
| G06N 3/02 | (2006.01) | |

(52) U.S. Cl.
CPC .......... *G06F 21/566* (2013.01); *G06F 21/565* (2013.01); *G06N 3/02* (2013.01); *G06F 2221/034* (2013.01)

(58) Field of Classification Search
CPC ............. G06F 21/566; G06F 2221/034; G06F 21/565; G06N 3/02; G05B 23/0254
See application file for complete search history.

(56) References Cited

U.S. PATENT DOCUMENTS

| | | | |
|---|---|---|---|
| 2020/0364338 A1 | 11/2020 | Ducau et al. | |
| 2021/0133322 A1* | 5/2021 | Healy | G06N 20/00 |
| 2021/0319232 A1* | 10/2021 | Perazzi | G06N 3/08 |
| 2022/0083662 A1* | 3/2022 | Grobman | G06N 20/00 |
| 2022/0255897 A1* | 8/2022 | Miele | H04L 63/1425 |

FOREIGN PATENT DOCUMENTS

| | | |
|---|---|---|
| CN | 111382439 A | 7/2020 |
| CN | 111552965 A | 8/2020 |
| CN | 112329016 A | 2/2021 |

OTHER PUBLICATIONS

Bounouh et al., "A Scalable Malware Classification based on Integrated Static and Dynamic Features", International Conference on Global Security, Safety and Sustainability, pp. 113-124, Spingge, New York (2017).

Islam et al., "Classification of Malware Based on String and Function Feature Selection", Cybercrime and Trustworthy Computing Workshop (CTC), 2010, pp. 9-17.

Kolter et al., "Learning to Detect and Classify Malicious Executables in the Wild", Journal of Machine Learning Research 7 (2006) 2721-2744.

(Continued)

*Primary Examiner* — Evans Desrosiers
(74) *Attorney, Agent, or Firm* — Slater Matsil, LLP

(57) ABSTRACT

Methods and systems for detecting whether an executable file comprises malware are disclosed. The methods and systems rely on various feature extraction and feature representation processes to allow patterns associated with Portable Executable (PE) files to be analyzed in an improved representation space. In one example, six different feature sets are extracted from a PE file and represented in six different feature spaces, before being input into a multivariate ensemble deep neural network-based model.

12 Claims, 21 Drawing Sheets

(56) References Cited

OTHER PUBLICATIONS

Schultz et al., "Data Mining Methods for Detection of New Malicious Executables", Security and Privacy, 2001, Proceedings of 2001 IEEE Symposium, May 14-16, pp. 38-49 (2001).

Tian et al., "An Automated Classification System Based on the Strings of Trojan and Virus Families", 2009 4th International Conference on Malicious and Unwanted Software (Malware), pp. 23-30.

GitHub—fireeye / stringsifter: "A machine learning tool that ranks strings based on their relevance for malware analysis", [online], [retrieved on May 14, 2021]. Retrieved from the Internet <https://github.com/fireeye/stringsifter>.

* cited by examiner

| | Name | Nb | Offset | RVA | SizeOfRawData | VirtualSize | EntryPoint | IsCode | Readable | Writable | Executable |
|---|---|---|---|---|---|---|---|---|---|---|---|
| 0 | .text | 1 | 1024 | 4096 | 13824 | 13352 | True | True | True | True | True |
| 1 | .rdata | 2 | 0 | 20480 | 0 | 65536 | False | False | True | True | False |
| 2 | .data | 3 | 14848 | 86016 | 43008 | 42586 | False | False | True | True | False |
| 3 | .brdata | 4 | 57856 | 1E+05 | 113152 | 114688 | False | True | True | True | True |
| 4 | gpirxfi | 5 | 171008 | 2E+05 | 31232 | 32768 | False | True | True | True | True |
| 5 | rzpqtps | 6 | 202240 | 3E+05 | 31232 | 32768 | False | True | True | True | True |
| 6 | xpqzmpx | 7 | 233472 | 3E+05 | 31232 | 32768 | False | True | True | True | True |
| 7 | uubyept | 8 | 264704 | 3E+05 | 31232 | 32768 | False | True | True | True | True |
| 8 | cifjnnc | 9 | 295936 | 4E+05 | 31744 | 32768 | False | True | True | True | True |
| 9 | gufrdve | 10 | 327680 | 4E+05 | 31744 | 32768 | False | True | True | True | True |
| 10 | hjvocgl | 11 | 359424 | 4E+05 | 31744 | 32768 | False | True | True | True | True |
| 11 | rmpimms | 12 | 391168 | 5E+05 | 31744 | 32768 | False | True | True | True | True |
| 12 | mdydbnb | 13 | 422912 | 5E+05 | 31744 | 32768 | False | True | True | True | True |

```
array([1797561463, 862511733, 1315258553, 2882791366, 1234517396,
       1166927838, 6854933266, 1206689897, 1735550084, 1977848267,
       4096333366, 3037096856, 1740452038, 2436625473, 3173192299,
       1883392403, 9784591157, 1622680634, 2557207867, 6700431499,
       1775169738, 2685706171, 3357138100, 1291802884, 3686540602,
       3700497221, 2238170272, 5170221855, 1101216939, 8503592286,
       1994578884, 4207874439, 1460081680, 1496114553, 1527620330,
       2438017786, 2081803661, 3140386839, 6551320529, 2022396677,
       1583089082, 2915465573, 3925152859, 1213843213, 1219821241,
       2922694897, 4115514415, 2479561386, 1023620199, 1016224467,
       2265681828, 1407064103, 9151241818, 2135793527, 7307590069,
       1480084108, 3330624441, 1709640276, 1656323730, 1800744015,
       1246611156, 9160278992, 1566605602, 7625578881, 1882238076,
       8506399988, 8551803435, 1422081989, 7221171647, 1217515591,
       1569048024, 2225149393, 3456299052, 6240809595, 7040999973,
       1975176773, 1202724337, 2547401266, 1084789177, 1604970312,
       3077984794, 9543714095, 1444899319, 3325793084, 1731867185,
       3673326270, 3051552733, 2585315240, 1708992789, 5088124406,
       2226974691, 1870261803, 3992073544, 4042472243, 2522583744,
       2617674622, 1822623366, 1581290803, 1210429306, 2738782864,
       3784261428, 1406943439, 3178229864, 3150816378, 4202152915,
       4449687800, 1558963157, 9525981977, 7024171977, 4643077407,
       1277602286, 4806354487, 1080945655, 2021112407, 6776022744,
       1506114179, 2018180548, 6564565771, 1599313445, 2039516091,
       1832234404, 2062675505, 9622307622, 1005779772, 7788371464,
       6218222663, 9935965977, 2303632867], dtype=uint64)
```

FIG. 11B

| Category | Statistics |
|---|---|
| General | #string, #noise, #English sentence, #repeated character, #file extension |
| Domain knowledge | #winApi, #dll, #common dll, #malware dll, #cpp, #fun_ma I, #pe_arti, #language, #date, #blacklist |
| Entropy | Avg, Max, Min, and Quantile10 (Quantile100) |
| Length | Avg, Max, Min, and Quantile10 (Quantile100) |

FIG. 13A

| | | | | | |
|---|---|---|---|---|---|
| avg entropy | 1.476240 | 1.486798 | 1.484561 | 1.649485 | 1.472485 |
| avg_length | 4.615260 | 4.896353 | 6.168616 | 9.397227 | 4.571103 |
| max_entropy | 2.906294 | 2.906294 | 3.608799 | 4.094345 | 2.302585 |
| max_length | 40.000000 | 40.000000 | 911.000000 | 960.000000 | 12.000000 |
| min entropy | 0.000000 | 1.039721 | 0.000000 | 0.000000 | 1.039721 |
| min_length | 4.000000 | 4.000000 | 4.000000 | 4.000000 | 4.000000 |
| numblacldist | 0.000000 | 0.000000 | 0.000000 | 8.000000 | 0.000000 |
| num_common_dll | 1.000000 | 1.000000 | 11.000000 | 15.0000 | 2.000000 |
| numcpp | 0.000000 | 0.000000 | 1.000000 | 101.000000 | 0.000000 |
| num_date | 0.000000 | 0.000000 | 0.000000 | 20.0001000 | 0.000000 |
| numdll | 1.000000 | 1.000000 | 18.0000 | 25.000000 | 2.000000 |
| num_english | 1.0(30000 | 1.000000 | 108.000000 | 184.000000 | 0.000000 |
| num_fileextension | 29.000000 | 0.000000 | 45.000000 | 9.000000 | 1.000000 |
| num_fun_rnal | 1.000000 | 0.000000 | 7.000000 | 83.000000 | 1.0001000 |
| numidentmal | 0.0000 | 0.000000 | 0.000000 | 0.000000 | 0.000000 |
| num_language | 0.000000 | 0.000000 | 0.000000 | 13.030000 | 0.000000 |
| num_maldll | 0.0000 | 0.000000 | 1.000000 | 2.000000 | 0.000000 |
| num_noise | 864.000000 | 113.000000 | 2657.000000 | 2442.000000 | 244.000000 |
| num_pe_arti | 4.000000 | 3.000000 | 5.000000 | 41.000000 | 2.000000 |
| num_rpt_char | 1.000000 | 0.000000 | 121.000000 | 136.000000 | 0.000000 |
| num_string | 4325.000000 | 521.000000 | 12057.000000 | 4471.000000 | 1315.000000 |
| numwinapi | 7.000000 | 8000000 | 17.000000 | 404.000000 | 1.000000 |
| quantfie entropy 1 | 1.039721 | 1.039721 | 0.151866 | 0.000000 | 1.039721 |
| quantile entropy 10 | 1.386294 | 1.386294 | 1.332179 | 1.039721 | 1.386294 |
| (pantile entropy 11 | 1.386294 | 1.386294 | 1.386294 | 1.039721 | 1.386294 |
| quantile entropy 12 | 1.386294 | 1.386294 | 1.386294 | 1277034 | 1.386294 |
| quantile entropy_13 | 1.386294 | 1.386294 | 1.386294 | 1.332179 | 1.386294 |
| quantile entropy 14 | 1.386294 | 1.386294 | 1.386294 | 1.332179 | 1.386294 |
| quantikcntropy_15 | 1.386294 | 1.386294 | 1.7-4f.294 | 1.332179 | 1.386294 |
| quantile entropy 16 | 1.386294 | 1.386294 | 1.386294 | 1.386294 | 1.386294 |

FIG. 13B

MULTIVARIATE MALWARE DETECTION METHODS AND SYSTEMS

CROSS REFERENCE TO RELATED APPLICATIONS

The present application is the first application related to the subject matter disclosed herein.

FIELD

The present disclosure generally relates to malware detection methods and systems. More specifically, the present disclosure relates to multivariate ensemble deep neural network methods and systems for detecting malicious executable files.

INTRODUCTION

Several static program analysis techniques are known for predicting malicious behavior in portable executable (PE) files. While these techniques typically produce highly reliable and interpretable results, they also tend to be labor-intensive and require substantial analysis time and domain knowledge.

In order to address the technical problems associated with static program analysis techniques, a number of techniques based on machine learning (ML) models and/or data mining (DM) models have been developed. Such techniques are comparatively fast, can be automated and adapt quickly as more data (labeled samples) become available for use in the ML models, for example.

As such, applying ML classifiers on static program features has become a fast and reliable mechanism to classify malicious and benign files based on well-defined characteristics of executables files. Also, as opposed to traditional antivirus software that relies on detecting the binary patterns of malware, ML-based approaches have the potential to enable signature-less malware detection and thus prevent zero-day attacks.

In response to these advances in malware detection, however, bad actors, such as malware developers, have in recent years increased their use of obfuscation, polymorphism, and metamorphism to change the binary representations of malware while keeping their malicious functionality. Some even use advanced machine learning techniques to provide large scale malware production aimed at evading existing ML-based solutions.

Accordingly, Anti-Virus (AV) vendors increasingly require efficient (i.e., fast) and effective (i.e., accurate) methods of malware detection that can mitigate the risks associated with zero-day attacks. There is therefore a clear need for methods and systems of malware detection that can ensure high True Positive Rates (TPR) and low False Positive Rates (FPR) while at the same time ensuring rapid detection of zero-day malware attacks.

SUMMARY

The following summary is intended to introduce the reader to the more detailed description that follows, and not to define or limit the claimed subject matter.

The present disclosure generally relates to multivariate malware detection methods and systems that combine a plurality of representation spaces into a multivariate ensemble deep neural network architecture.

According to one aspect of the present disclosure, there is provided a multivariate malware detection method comprising several steps (steps are not necessarily presented in order). A first step comprises receiving an executable file. A second step comprises extracting a plurality of feature sets from the executable file, to generate a plurality of extracted feature sets, the plurality of feature sets relating to characteristics of the executable file. A third step comprises representing the plurality of extracted feature sets in one or more corresponding feature spaces to generate a plurality of represented feature sets. A fourth step comprises inputting the plurality of represented feature sets into the inputs of a corresponding plurality of deep neural networks. A fifth step comprises combining the plurality of deep neural networks into a multivariate ensemble deep neural network. A sixth step comprises detecting the presence of malware in the executable file based on the output of the multivariate ensemble deep neural network.

According to another aspect of the present disclosure, there is provided a multivariate detection system for detecting whether an executable file comprises malware. The system comprising a processor and at least one non-transitory memory containing instructions which when executed by the processor cause the system to perform the following steps (steps are not necessarily presented in order). In a first step, the system receives an executable file. In a second step, the system extracts a plurality of feature sets from the executable file, to generate a plurality of extracted feature sets, the plurality of feature sets relating to characteristics of the executable file. In a third step, the system represents the plurality of extracted feature sets in one or more corresponding feature spaces to generate a plurality of represented feature sets. In a fourth step, the system inputs the plurality of represented feature sets into the inputs of a corresponding plurality of deep neural networks. In a fifth step, the system combines the plurality of deep neural networks into a multivariate ensemble deep neural network. In a sixth step, the system detects the presence of malware in the executable file based on the output of the multivariate ensemble deep neural network.

In some examples of the above method and system, the plurality of feature sets comprises six feature sets.

In some examples of the above method and system, one of the plurality of feature sets comprises header information relating to the parameters of the executable file.

In some examples of the above method and system, one of the plurality of feature sets comprises imported functions and libraries listed as being used by the executable file.

In some examples of the above method and system, one of the plurality of feature sets comprises the value of the bytes located in the section containing the entry point of the executable file.

In some examples of the above method and system, one of the plurality of feature sets comprises characteristics of the assembly language instructions of the entry function of the executable file.

In some examples of the above method and system, one of the plurality of feature sets comprises section characteristics of the executable file.

In some examples of the above method and system, one of the plurality of feature sets comprises a plurality of printable strings and associated locations of each of the plurality of printable strings in the executable file.

In some examples of the above method and system, each output of the plurality of deep neural networks is weighted prior to the combining step.

The present disclosure provides, inter alia, technical advantages associated with enabling better space representation of executable files based on different feature extraction and feature representations processes that enable an ensemble DNN-based model to achieve a very high True Positive Rate (TPR) and a very low False Positive Rate (FPR).

DRAWINGS

In order that the claimed subject matter may be more fully understood, reference will be made to the accompanying drawings, in which:

FIG. 10 is a table represented example extracted features of a fifth exemplary branch of a multivariate ensemble DNN-based architecture in accordance with examples disclosed herein;

FIGS. 11A and 11B are tables representing example feature representations of a fifth exemplary branch of a multivariate ensemble DNN-based architecture in accordance with examples disclosed herein;

FIGS. 13A and 13B are tables representing example feature representations of a sixth exemplary branch of a multivariate ensemble DNN-based architecture in accordance with examples disclosed herein;

DESCRIPTION OF VARIOUS EMBODIMENTS

Figure 1:
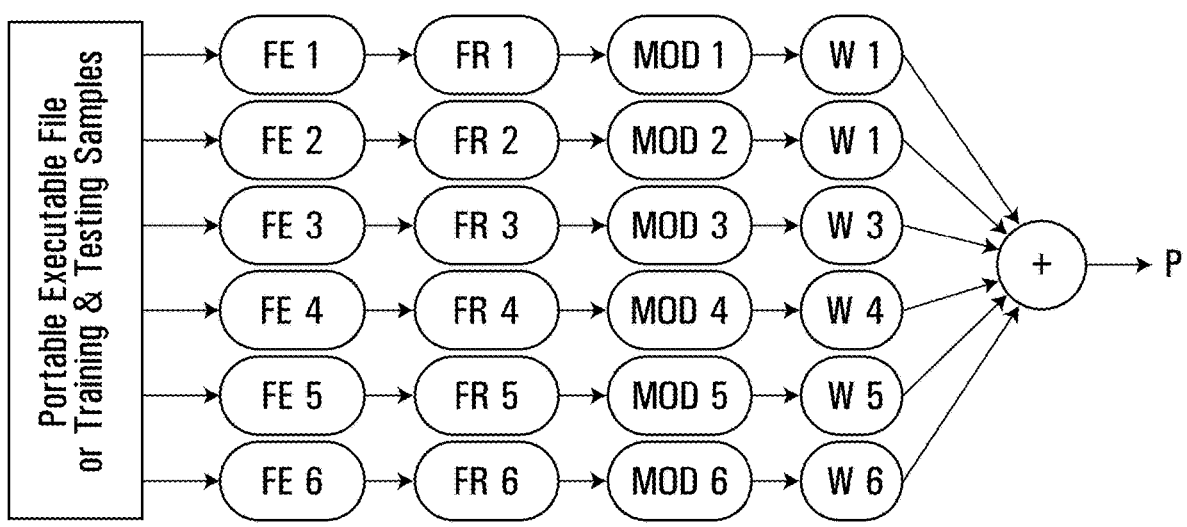
FIG. 1 is schematic diagram of a multivariate ensemble DNN-based architecture in accordance with the present disclosure.

It will be appreciated that, for simplicity and clarity of illustration, where considered appropriate, reference numerals may be repeated among the figures to indicate corresponding or analogous elements or steps. Numerous specific details are set forth in order to provide a thorough understanding of the exemplary embodiments of the subject matter described herein.

However, it will be understood by those of ordinary skill in the art that the embodiments described herein may be practiced without these specific details. In other instances, well-known methods, procedures and components have not been described in detail so as not to obscure the present subject matter. Furthermore, this description is not to be considered as limiting the scope of the subject matter in any way but rather as illustrating the various embodiments.

As used herein, an "executable file", "executable program" or "executable" is defined as a file that can cause a computing device to perform indicated tasks according to encoded instructions.

As used herein, the term "Portable Executable (PE)" or "PE" is defined as a file format for various files, including but not limited to executable files, object code and Dynamic-Link Library (DLL), used in the Windows™ operating systems. The structure, characteristics, parameters and contents of portable executable files are well known to the skilled reader and are not included herein for the sake of brevity.

As used herein, the term "feature" is an individual measurable property or characteristic of an executable file which can be used to train a machine learning model. A feature can include, but is not limited to, information included in or referenced in the file header of an executable file, information included in or referenced in the section headers of an executable file and/or information included in or referenced in the sections of an executable file. As used herein, the term "feature set" is a set of one or more features.

As used herein, the term "feature space" is an n-dimensional reference space in which features can be represented. Feature representation is a technique used because machine learning models require inputs that are mathematically and computationally convenient to process.

As used herein, a "deep neural network" is a type of artificial neural network comprising an input layer, an output layer and a number of hidden layers between the input layer and the output layer.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

FIG. 1 shows a multivariate DNN-based architecture for detecting malicious portable executable files. By way of general introduction, the architecture shown in FIG. 1 comprises six branches (n=1, 2, 3, 4, 5 and 6), each of which includes a feature extraction block (FE n) that is configured to extract a feature set from the executable file, thereby generating an extracted feature set. Each branch also includes a feature representation block (FR n) that is configured to represent the extracted feature in a feature space, thereby generating a represented feature set. The skilled person will understand however that each branch may be made up of feature sets relating to a plurality of different features. Each branch also includes a DNN-based model (MOD n) that is configured to have the represented feature set input into it and is also trained to detect features or combinations of features associated with malware.

Accordingly, when one or more portable executable files are received, each branch extracts a feature set, represents the extracted feature set in a feature space and inputs the represented feature set into a deep neural network that has been trained to detect patterns in the feature space, the patterns being associated with malware. The outputs of each branch are combined together to form a multivariate ensemble deep neural network architecture. The deep neural network architecture is said to be "multivariate" because it uses a plurality of feature sets, each containing one or more features. As such, the deep neural network uses multiple variables (i.e., features) as inputs. The deep neural network architecture is said to be an "ensemble" deep neural network architecture because it relies on ensemble machine learning, which combines the predictions from multiple neural network models in order to reduce variance of predictions and reduce generalization error.

While six branches are shown in the example of FIG. 1, the present disclosure is not limited to the use of six branch. As such, in some embodiments, two or more branches may be used and, in some embodiments, more than six branches may be used. The penultimate DNN layer of each of the plurality of branches are concatenated to create a single ensemble DNN-based model resulting in malware prediction P. In some embodiments, prior to being concatenated, each branch n is individually weighted using weight n. As will be appreciated, assigning weights to each branch provides a mechanism for associating different levels of important to the outputs of each branch in the determination of prediction P and, as a result, in the detection of the presence of malware in the executable file.

Figure 2:
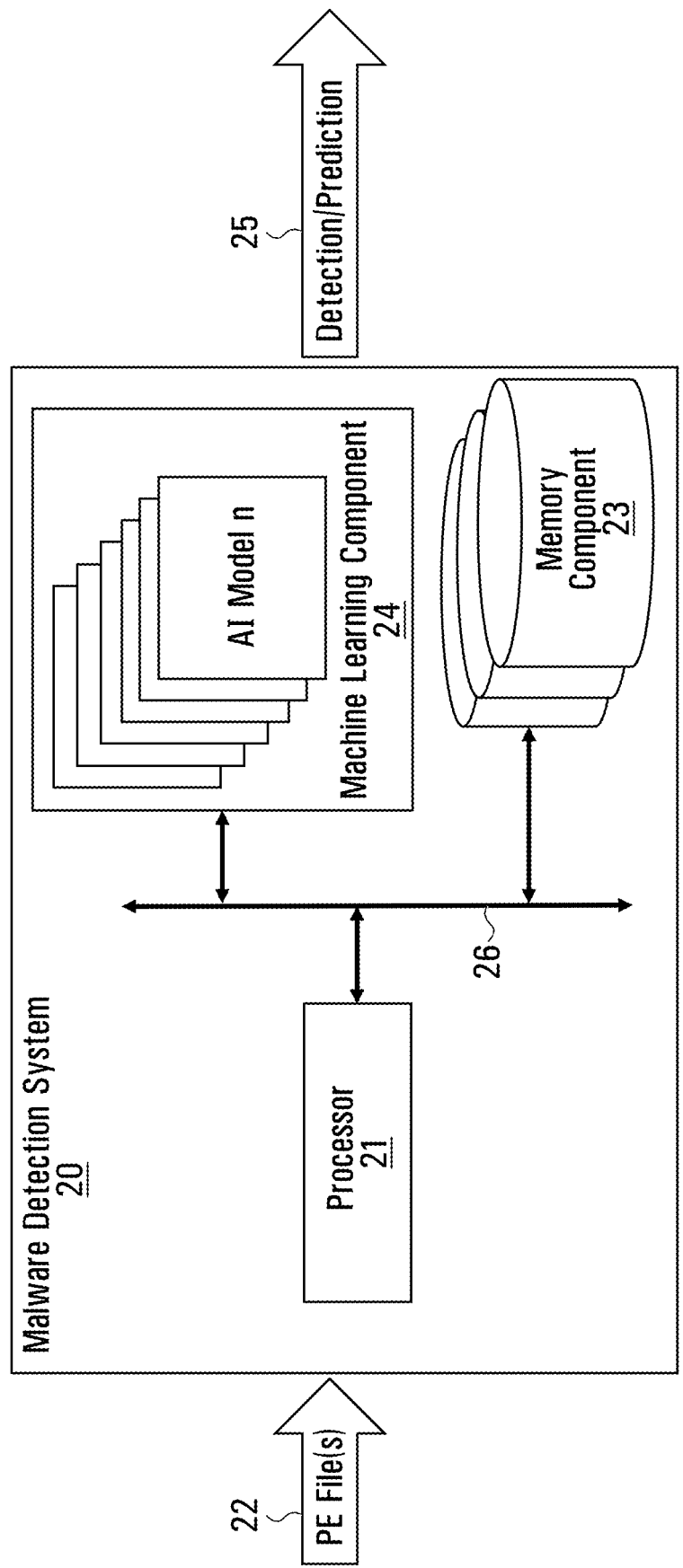
FIG. 2 is a schematic diagram of a system for implementing a multivariate ensemble DNN-based architecture in accordance with examples disclosed herein.

FIG. 2 is a schematic diagram of a system 20 used for implementing an DNN-based architecture in accordance with examples disclosed herein. A PE file 22 may be received via a data acquisition module (not shown) and a detection/prediction 25 can be generated, which detection/prediction 25 can be displayed (or otherwise conveyed or reported or made known to) to a user or another system. In the example shown in FIG. 2, the malware detection system 20 includes a processor 21, a memory component 23 and a machine learning component 24 configured to implement one or more of the architectures described here with reference to FIG. 1. The various elements of the malware detection system 20 can be interconnected using a data bus 26 (e.g., one or more electrical conductors or any other suitable bus). The malware detection system 20 may include one or more communication components (not shown) configured to allow the malware detection system 20 to communication with a data communications network such as the Internet, and communication thereto/therefrom can be provided over a wired connection and/or a wireless connection (e.g., WiFi, WiMAX, cellular, etc.).

Processor 21 may comprise one or more processors for performing processing operations that implement functionality of the malware detection system 20. A processor of processors 21 may be a general-purpose processor executing program code stored in memory component 23 to which is has access. Alternatively, a processor of processor 21 may be a specific-purpose processor comprising one or more pre-programmed hardware or firmware elements (e.g., application-specific integrated circuits (ASICs), electrically erasable programmable read-only memories (EEPROMs), etc.) or other related elements.

Memory component 23 comprises one or more memories for storing program code executed by processor 21 and/or data used during operation of processor 21. A memory of memory component 23 may be a semiconductor medium (including, for example, a solid-state memory), a magnetic storage medium, an optical storage medium, and/or any other suitable type of memory. A memory of memory component 23 may be read-only memory (ROM) and/or random-access memory (RAM), for example.

In some embodiments, two or more elements of processor 21 may be implemented by devices that are physically distinct from one another and may be connected to one another via data bus 26 or via a communication link. In other embodiments, two or more elements of processor 21 may be implemented by a single integrated device. As will be appreciated by the skilled reader, the hardware and software components of malware detection system 20 may be implemented in any other suitable way in other embodiments.

Figure 3:
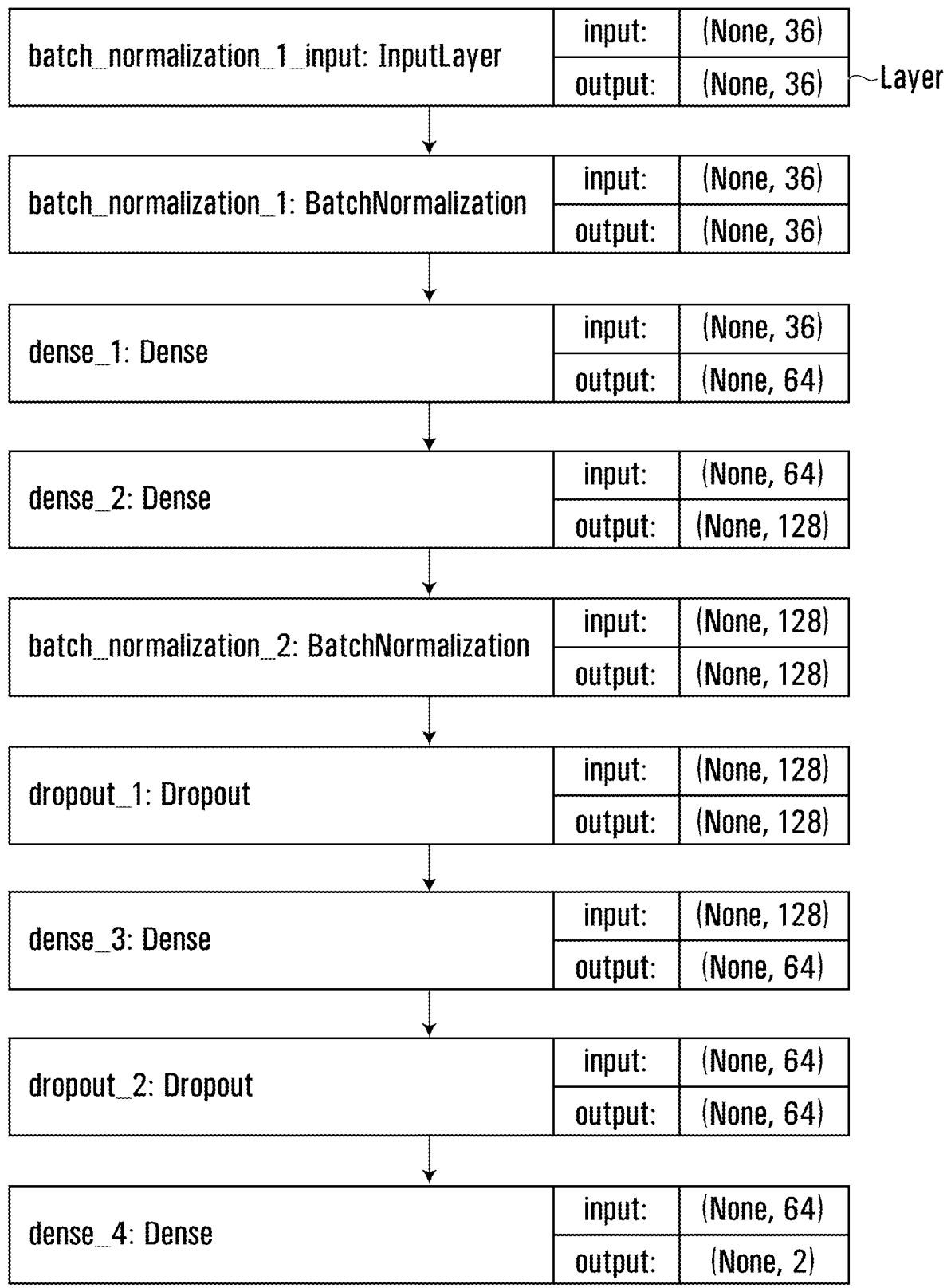
FIG. 3 is a schematic block diagram representing a multilayer perceptron DNN of a first exemplary branch of a multivariate ensemble DNN-based architecture in accordance with examples disclosed herein.

With reference to FIG. 3, a first exemplary branch of the multivariate DNN-based architecture of FIG. 1 will now be described. The feature sets relating to the first exemplary branch comprise header information relating to the parameters of an executable file.

FIG. 3 is a schematic block diagram representing a multilayer perceptron DNN of the first exemplary branch of an example multivariate ensemble DNN-based architecture in accordance with the present disclosure. A multilayer perceptron is a feedforward artificial neural network comprising an input layer, one or more hidden layers and an output layer. The data relating to this first exemplary branch comprise information forming part of the PE header. In some embodiments, the parameters collected can include the following:

[AddressOfEntryPoint, Machine, SizeOfOptionalHeader, Characteristics, MajorLinkerVersion, MinorLinkerVersion, SizeOfCode, SizeOfInitializedData, SizeOfUninitializedData, BaseOfCode, ImageBase, SectionAlignment, FileAlignment, MajorOperatingSystemVersion, MinorOperatingSystemVersion, MajorImageVersion, MinorImageVersion, MajorSubsystemVersion, MinorSubsystemVersion, SizeOfImage, SizeOfHeaders, CheckSum, Subsystem, DllCharacteristics, SizeOfStackReserve, SizeOfStackCommit, SizeOfHeapReserve, SizeOfHeapCommit, LoaderFlags, NumberOfRvaAndSizes, SectionsNb, SectionsMeanEntropy, SectionsMinEntropy, SectionsMaxEntropy, SectionsMeanRawsize, SectionsMinRawsize, SectionsMaxRawsize, SectionsMeanVirtualsize, SectionsMinVirtualsize, SectionMaxVirtualsize, ImportsNbDLL, ImportsNb, ImportsNbOrdinal, ExportNb, ResourcesNb, ResourcesMeanEntropy, ResourcesMinEntropy, ResourcesMaxEntropy, ResourcesMeanSize, ResourcesMinSize, ResourcesMaxSize, LoadConfigurationSize, VersionInformationSize, VersionInformationSize, FileFlags, FileOS, FileType, FileVersionLS, ProductVersionLS, Signature, StrucVersion]

Some PE file header information is more predictable than other PE file header information. As such, not all header information is equally valuable in helping to predict the likelihood of malware. In some embodiments, the most valuable parameters extracted from the PE file header parameters includes:

[ResourcesMaxEntropy, Characteristics, MajorSubsystemVersion, SectionsMaxEntropy, Machine, ResourcesMeanEntropy, ResourcesMinEntropy, DllCharacteristics, SectionsMeanEntropy, ImageBase, SectionsMinEntropy, MinorLinkerVersion, Subsystem, MajorOperatingSystemVersion]

In some embodiments, the extracted feature set for the first exemplary branch of the multivariate DNN-based architecture includes: [MajorSubsystemVersion, Machine, MajorOperatingSystemVersion, MinorLinkerVersion, Subsystem]

In order to continue preparing the inputs to the multilayer perceptron DNN of FIG. 3, the extracted feature set can be encoded using one-hot encoding to generate a represented feature set. One-hot encoding is the encoding of information into a group of bits among which the allowable combinations of values are only those with a single bit being high and all others being low. The represented feature set of the first exemplary branch can then be input into the first exemplary model shown in FIG. 3.

As shown in FIG. 3, the first exemplary model comprises a plurality of layers, each layer having inputs and outputs. As can be seen from FIG. 3, the size of the output of one layer will match the size of the input of the next layer, and so on. In the exemplary model shown in FIG. 3, each layer is one of an input layer, a dense layer, a dropout layer or a batch normalization layer, each of which will, individually, be known to the skilled reader.

Figure 17:
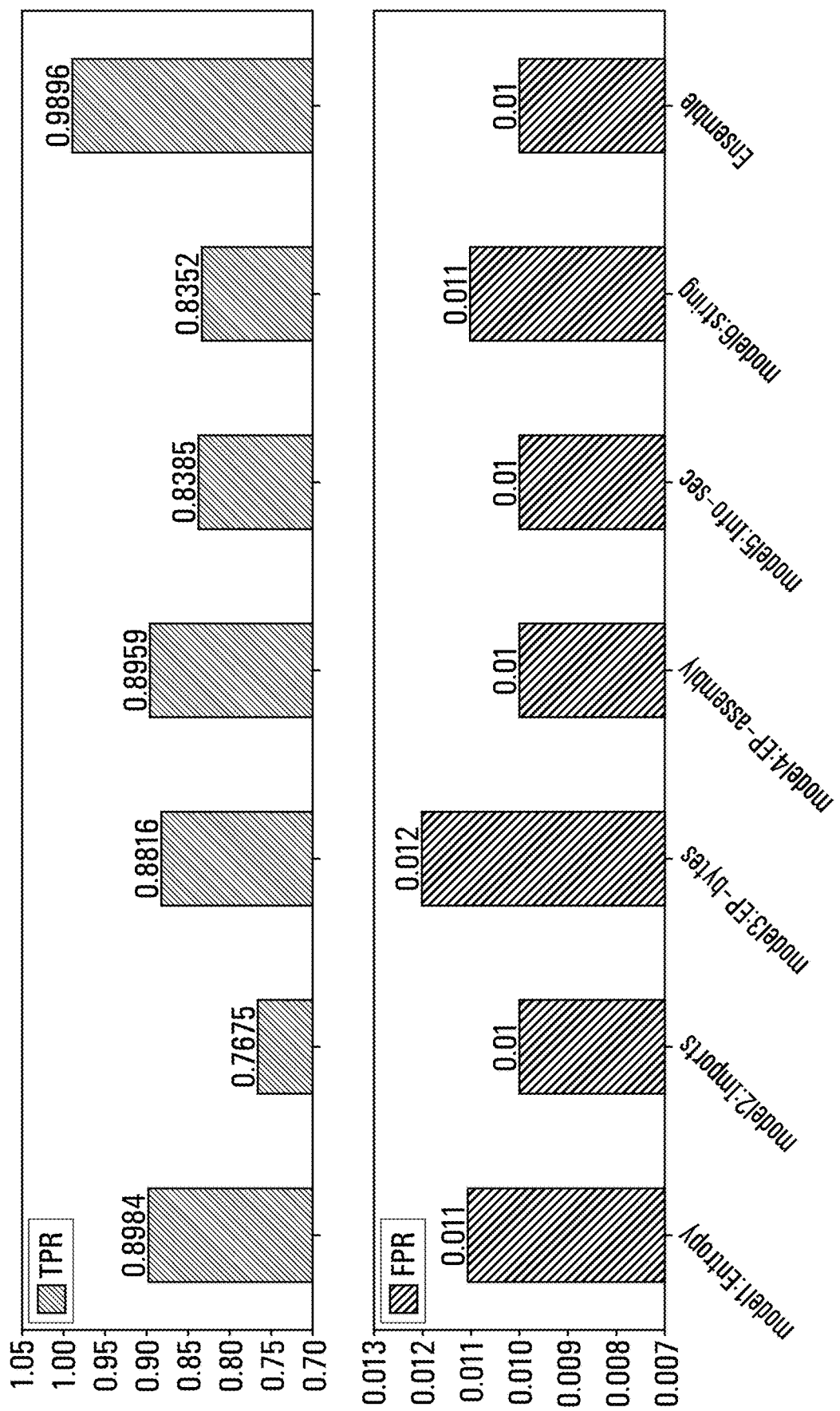
FIG. 17 are two column graphs representing the relative performances of the DNN-based models described herein.

In some embodiments, a dataset of sample executable files can be used to train and test the first exemplary model. In some of such embodiments, the architecture of the first exemplary model shown in FIG. 3 can be trained using 80% of the samples in the dataset and tested using the remaining 20% of the samples. In an example of one such embodiment, the first exemplary model achieved a True Positive Rate (TPR) of 89.84% and a False Positive Rate (FPR) of 1.1%, as shown in FIG. 17.

Figure 4:
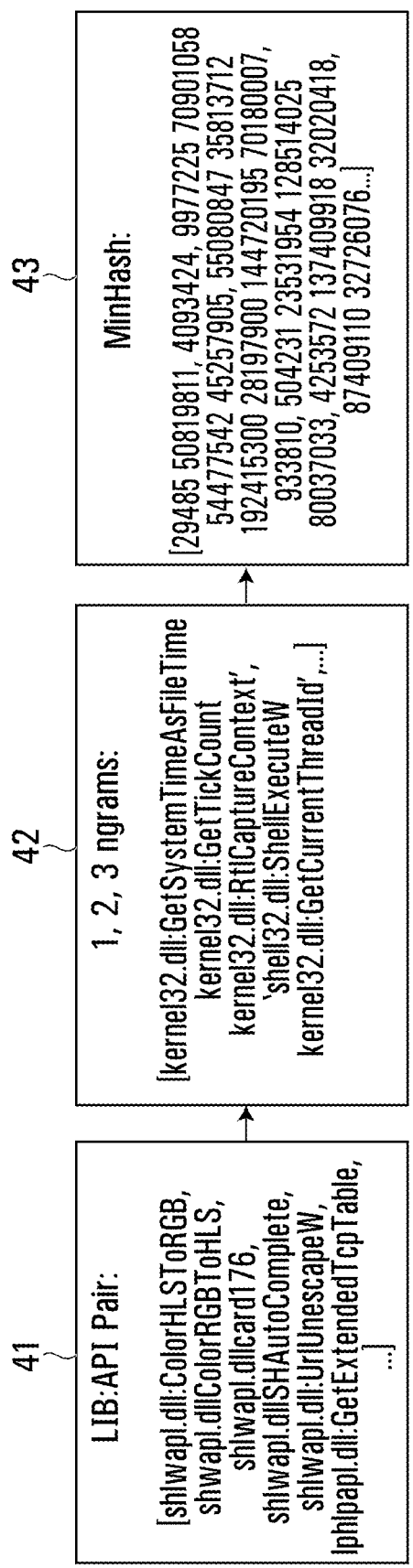
FIG. 4 is diagram representing example feature representations of a second exemplary branch of a multivariate ensemble DNN-based architecture in accordance with examples disclosed herein.
Figure 5:
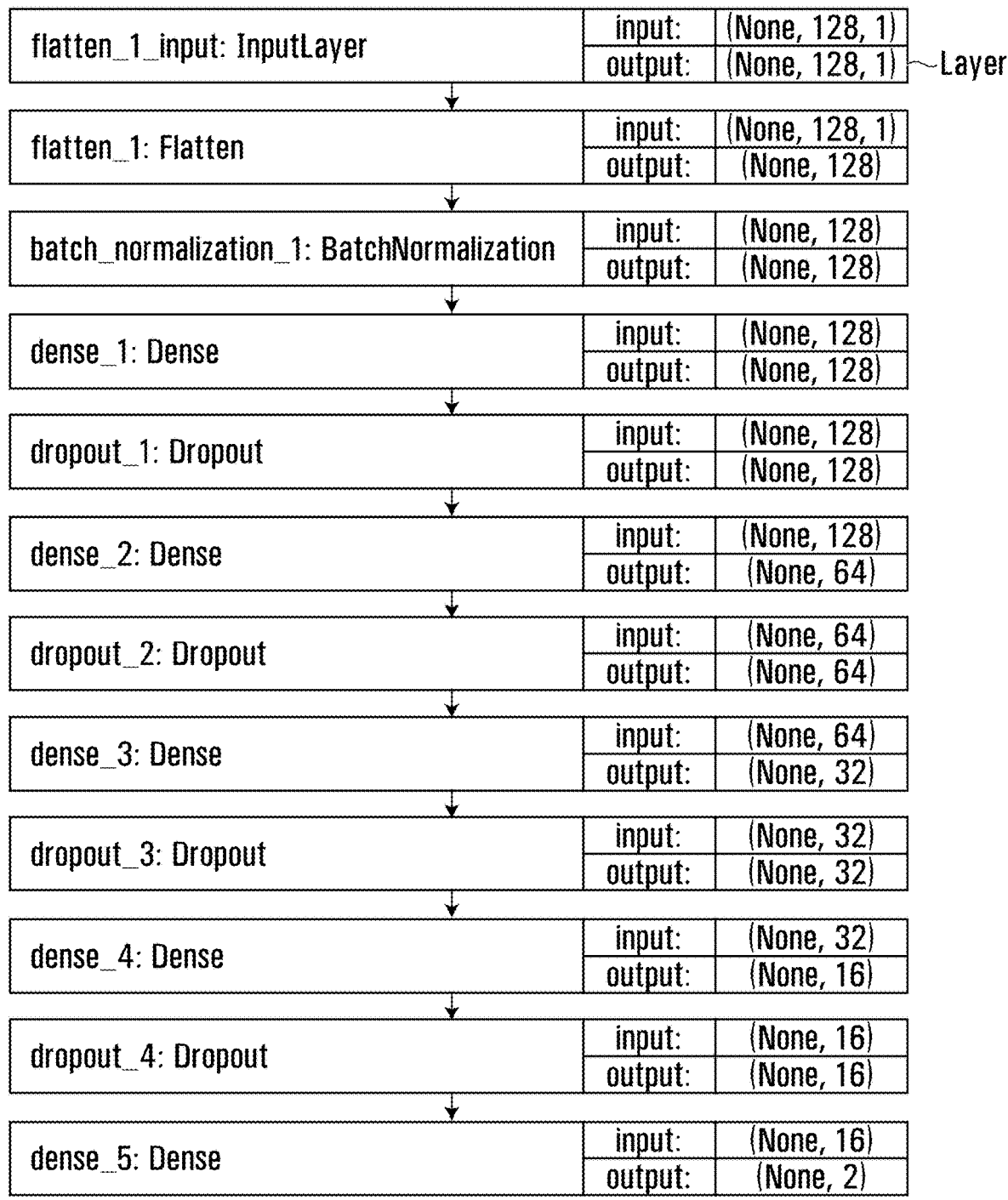
FIG. 5 is a schematic block diagram representing a multilayer perceptron DNN of a second exemplary branch of a multivariate ensemble DNN-based architecture in accordance with examples disclosed herein.

With reference to FIGS. 4 and 5, a second exemplary branch of the multivariate DNN-based architecture of FIG. 1 will now be described. The feature sets relating to the second exemplary branch comprise imported functions and libraries listed as being used by the executable file.

FIG. 5 is a schematic block diagram representing a multilayer perceptron DNN of the second exemplary branch of an example multivariate ensemble DNN-based architecture in accordance with the present disclosure. The data relating to this second exemplary branch comprise imported functions, i.e., Application Programming Interface (API), and import libraries, used by the PE file. The first step in extracting this information is to use a parsing tool to determine if the PE file has a DIRECTORY_ENTRY_IMPORT object.

Suitable parsing tools include, but are not limited to, Portable Executable reader module (pefile). Then, if an object is found, the system can iterate through every entry in the object and list all the DLLs and corresponding imported functions. If using ordinal, a lookup table can be used to find API functions associated with certain DLLs. In some embodiments, the extracted feature sets will comprise a list of DLL (aka LIB) and API pairs. In the exemplary branch shown in FIGS. 4 and 5, the extracted feature set can comprise the following LIB:API pairs, for example:

[shlwapi.dll:ColorHLSToRGB, shlwapi.dll:ColorRGBToHLS, shlwapi.dll:ord176, shlwapi.dll:SHAutoComplete, shlwapi.dll:UrlUnescapeW, phlpapi.dll:GetExtendedTcpTable, . . . ]

In order to represent the extracted feature set, the method starts at step 41 by extracting a feature set comprising LIB:API pairs. Then, at step 42, the method includes the step of generating 1, 2 and 3 grams (shingles) of the LIB:API pairs. Finally, at step 43, the method includes the step of generating a list of min-wise independent permutations (MinHash) using 128 permutation. As will be appreciated by the skilled reader, MinHash is one of many locality sensitive hashing schemes that can be used in accordance with the systems and methods disclosed herein for estimating how similar two sets are.

The represented feature set of the second exemplary branch can then be input into the second exemplary model shown in FIG. 5. As shown in FIG. 5, the second exemplary model comprises a plurality of layers (each block), each layer having inputs and outputs. As can be seen from FIG. 5, the size of the output of one layer will match the size of the input of the next layer, and so on. In the exemplary model shown in FIG. 5, each layer is one of an input layer, a dense layer, a dropout layer, a batch normalization layer or a flatten layer, each of which will, individually, be known to the skilled reader.

In some embodiments, a dataset of sample executable files can be used to train and test the second exemplary model. In some of such embodiments, the architecture of the second exemplary model shown in FIG. 5 can be trained using 80% of the samples in the dataset and tested using the remaining 20% of the samples. In an example of one such embodiment, the second exemplary model achieved a True Positive Rate (TPR) of 76.75% and a False Positive Rate (FPR) of 1.0%, as shown in FIG. 17.

Figure 6:
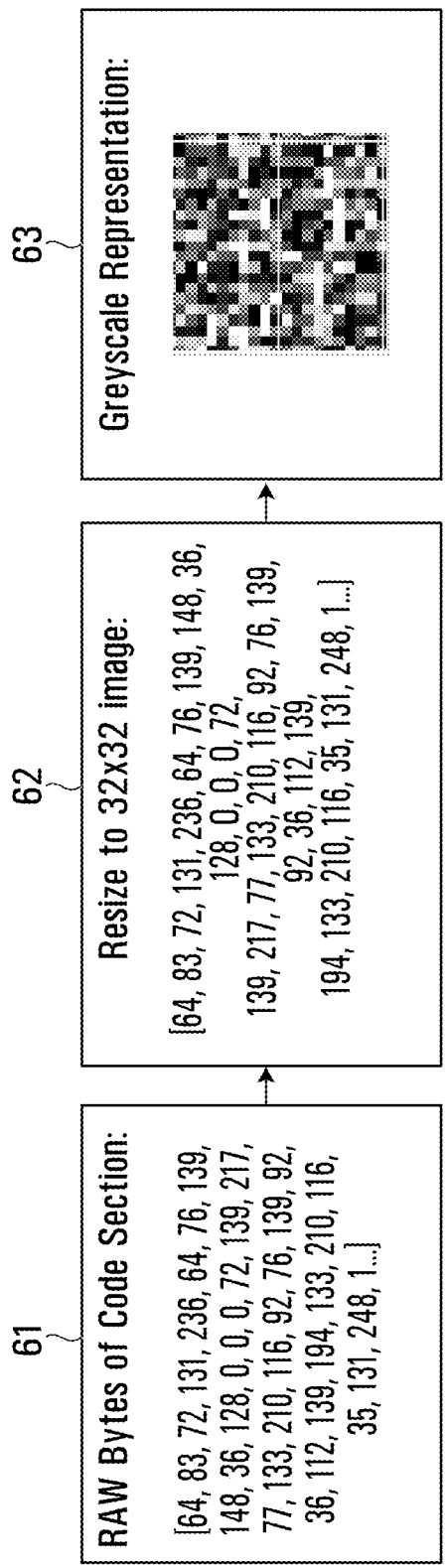
FIG. 6 is a diagram representing example feature representations of a third exemplary branch of a multivariate ensemble DNN-based architecture in accordance with examples disclosed herein.
Figure 7A:
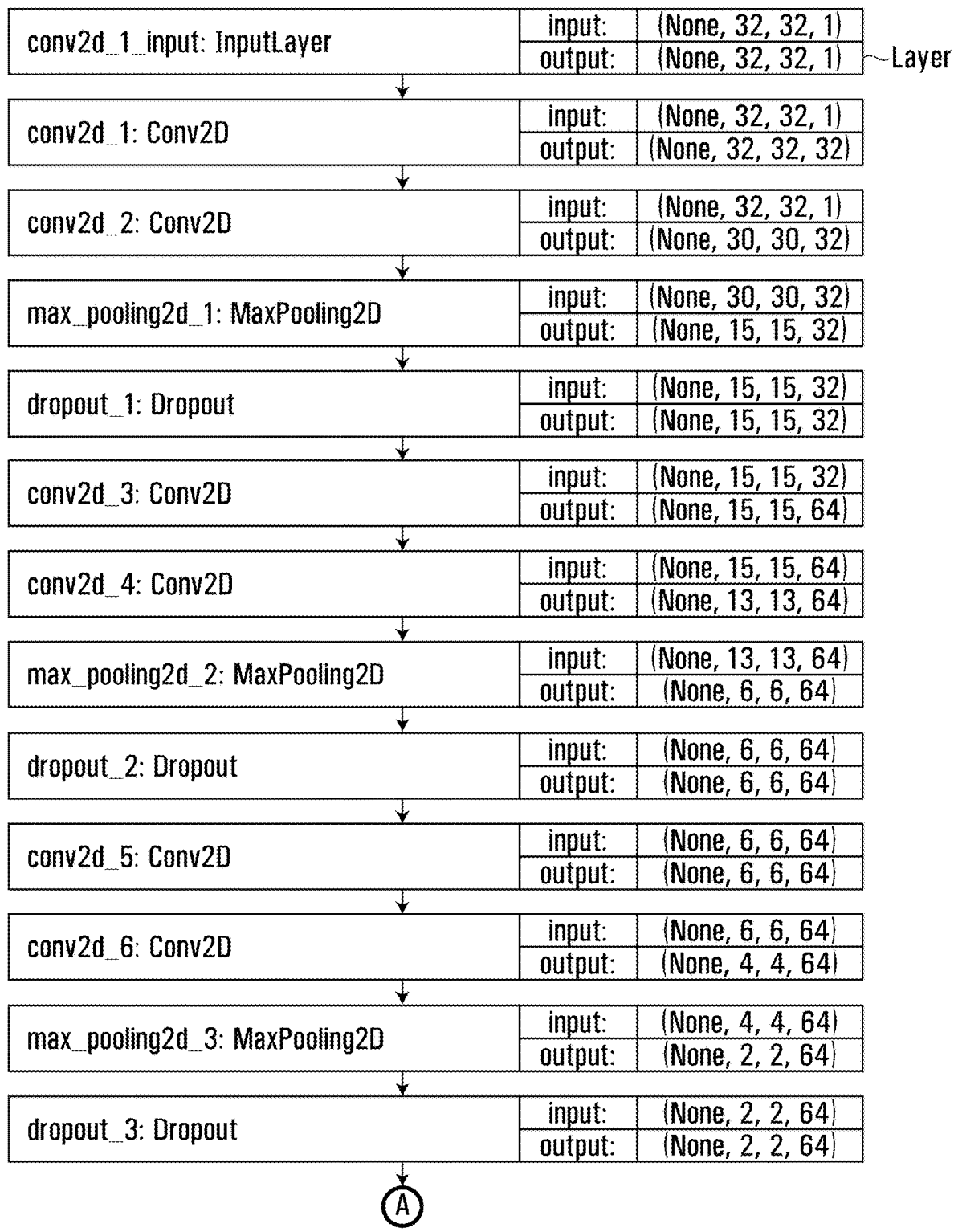
FIGS. 7A and 7B are a schematic block diagram representing a 2D convolutional neural network of a third exemplary branch of a multivariate ensemble DNN-based architecture in accordance with examples disclosed herein.
Figure 7B:
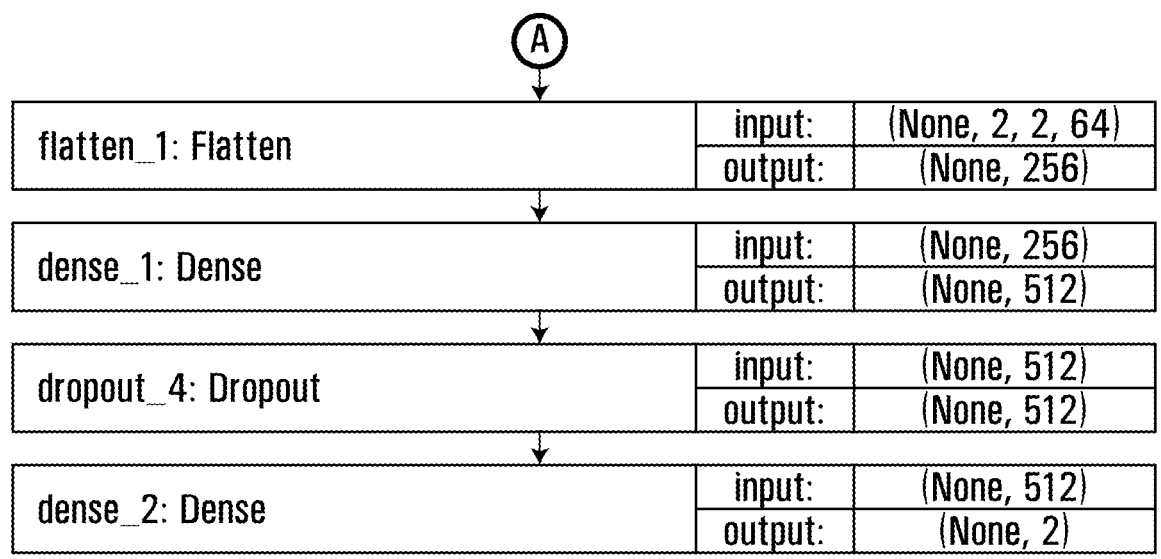

With reference to FIGS. 6, 7A and 7B, a third exemplary branch of the multivariate DNN-based architecture of FIG. 1 will now be described. The feature sets relating to the third exemplary branch comprise the values of a subset of the bytes located in the section containing the entry point of the executable file.

FIGS. 7A and 7B are a schematic block diagram representing a 2D convolutional neural network of a third exemplary branch of a multivariate ensemble DNN-based architecture in accordance with the present disclosure.

The data relating to this third exemplary branch comprises an extraction of the section where the Entry Point (EP) lies. As will be appreciated by the skilled reader, the entry point of an executable file is where the execution of instructions of a program begins. This is performed in part to verify if the address of the EP is within the boundaries of the determined section. Typically, the EP will be situated in the ".code" or ".text" sections of the PE file. An EP that lies in a different section of a PE file could in itself be suspicious. The feature extraction is performed by first extracting the EP address from the PE file. Then, the system can iterate through every section to check if the EP address is within the boundaries of the section in question. When the section in which the EP is located is determined, the system can collect all raw bytes (i.e., the value of the bytes) from the section. As such the raw extracted feature will be the value of the bytes of the section in which the EP is located.

As shown in FIG. 6, in order to generate a feature representation of the extracted raw bytes, in some embodiments, each byte can be represented as a pixel of a grayscale so it can be used to train the Convolutional Neural Network (CNN) model of FIGS. 7A and 7B. A convolutional neural network is a type of neural network typically used to analyze images. In other embodiments, each byte can be represented as a pixel in another color space. As has been appreciated by the inventors of the methods and systems described herein, many malware files having similarities in their capabilities also have similarities in their code section. Moreover, as has also been appreciated by the inventors of the methods and systems described herein, many benign files having similarities in their capabilities also have similarities in their code section. As shown in FIG. 6, each byte is a number from 0 to 255 which also can be mapped to a pixel of a grayscale. In some embodiments, before creating the greyscale representation at step 63, the number of "pixels" (i.e., raw data bytes) is cropped in order to generate a 32×32-pixel image. As will be appreciated, in order examples, other image sizes can be used.

The represented feature set (i.e., grayscale representation) of the third exemplary branch can then be input into the third exemplary model shown in FIGS. 7A and 7B. In particular, FIGS. 7A and 7B show a schematic block diagram representing a 2D convolutional neural network comprising a plurality of layers, each layer having inputs and outputs. As can be seen from FIGS. 7A and 7B, the size of the output of one layer will match the size of the input of the next layer, and so on. In the exemplary model shown in FIGS. 7A and 7B, each layer is one of an input layer, a 2D convolution layer (Conv2D), a 2d Max Pooling layer (MaxPooling2D), a dense layer, a dropout layer, or a flatten layer, each of which will, individually, be known to the skilled reader.

In some embodiments, a dataset of sample executable files can be used to train and test the third exemplary model. In some of such embodiments, the architecture of the third exemplary model shown in FIGS. 7A and 7B can be trained using 80% of the samples in the dataset and tested using the remaining 20% of the samples. In an example of one such embodiment, the third exemplary model achieved a True Positive Rate (TPR) of 88.16% and a False Positive Rate (FPR) of 1.2%, as shown in FIG. 17.

Figure 8:
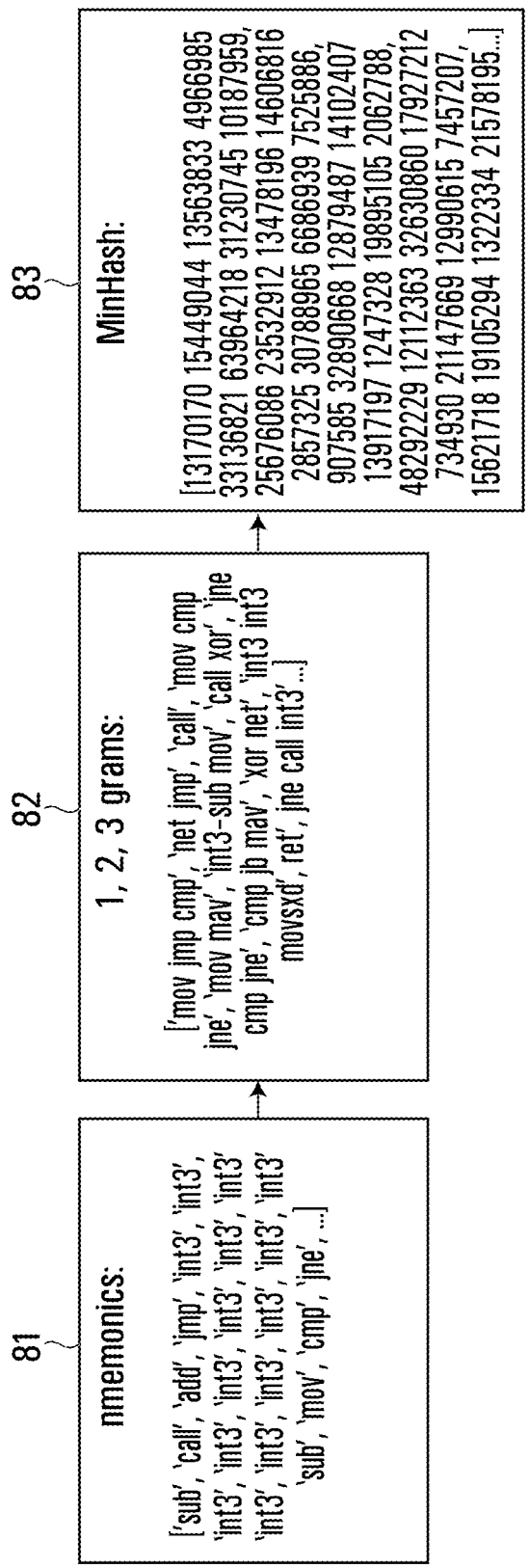
FIG. 8 is a diagram representing example feature representations of a fourth exemplary branch of a multivariate ensemble DNN-based architecture in accordance with examples disclosed herein.
Figure 9:
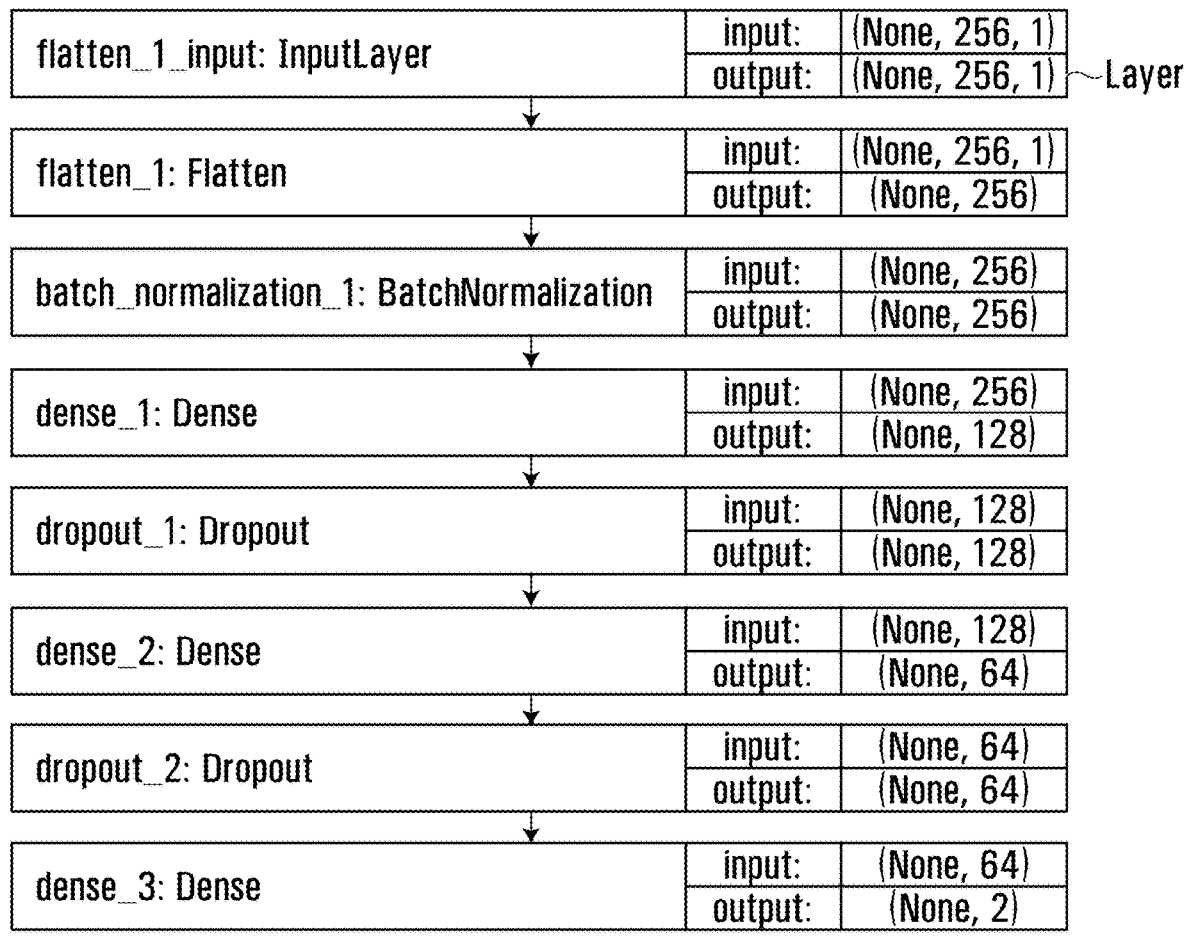
FIG. 9 is a schematic block diagram representing a multilayer perceptron DNN of a fourth exemplary branch of a multivariate ensemble DNN-based architecture in accordance with examples disclosed herein.

With reference to FIGS. 8 and 9, a fourth exemplary branch of the multivariate DNN-based architecture of FIG. 1 will now be described. The feature set relating to this fourth exemplary branch comprises characteristics of the assembly language instructions of the entry function of the executable file. In some embodiments, this information can be extracted from an executable file by using a reverse engineering framework such as Radare2™, combined with a disassembler such as Capstone™.

In a non-limiting example, this process could include first determining the file type using a file type library such as the Python-magic™ library. Then, the Capstone™ Architecture and Mode can be initialized using the file type determined in the previous step. The file can then be opened using the r2pipe module in Radare2™. In some embodiments, an analysis timeout of 30 seconds can be used to limit the analysis time, before analyzing the file using Radare2™. The raw bytes found in the Entry Point function can then be extracted and disassembled using Capstone™. Finally, the order, address, size, raw byte, mnemonic and operand of every instruction in the entry function of the executable file can be collected. The raw extracted feature set can be a list of dictionary of order, address, size, raw byte, mnemonic and operand.

Similarly to the representation method used in respect of the third exemplary branch, the feature representation method relating to the fourth exemplary branch, comprises a MinHash of 1, 2 and 3 grams of each mnemonic, as shown in steps 81, 82 and 83 of FIG. 8. As will be appreciated by the skilled reader, the use of ngrams (n representing an arbitrary number) provides greater flexibility in detecting slight modifications to the instructions of the entry function, as shown in FIG. 8.

The represented feature set of the fourth exemplary branch can then be input into the fourth exemplary model shown in FIG. 9. As shown in FIG. 9, the fourth exemplary model comprises a plurality of layers (each block), each layer having inputs and outputs. As can be seen from FIG. 9, the size of the output of one layer will match the size of the input of the next layer, and so on. In the exemplary model shown in FIG. 9, each layer is one of an input layer, a dense layer, a dropout layer, a batch normalization layer or a flatten layer, each of which will, individually, be known to the skilled reader.

In some embodiments, a dataset of sample executable files can be used to train and test the fourth exemplary model. In some of such embodiments, the architecture of the fourth exemplary model shown in FIG. 9 can be trained using 80% of the samples in the dataset and tested using the remaining 20% of the samples. In an example of one such embodiment, the fourth exemplary model achieved a True Positive Rate (TPR) of 89.59% and a False Positive Rate (FPR) of 1.0%, as shown in FIG. 17.

With reference to FIGS. 10, 11A, 11B and 12, a fifth exemplary branch of the multivariate DNN-based architecture of FIG. 1 will now be described. The feature set associated with the fifth exemplary branch comprises section characteristics of the executable file. In some embodiments, the section characteristics can be extracted using an executable file reader module such as, for example, the python PE parsing module pefile. In some embodiments, the section characteristics can include those shown in FIG. 10, namely Name, Position, Pointer to Raw Data, Relative Virtual Address (RVA), Size of Raw Data, Virtual Size, and if Entry Point is within the section.

Figure 11A:
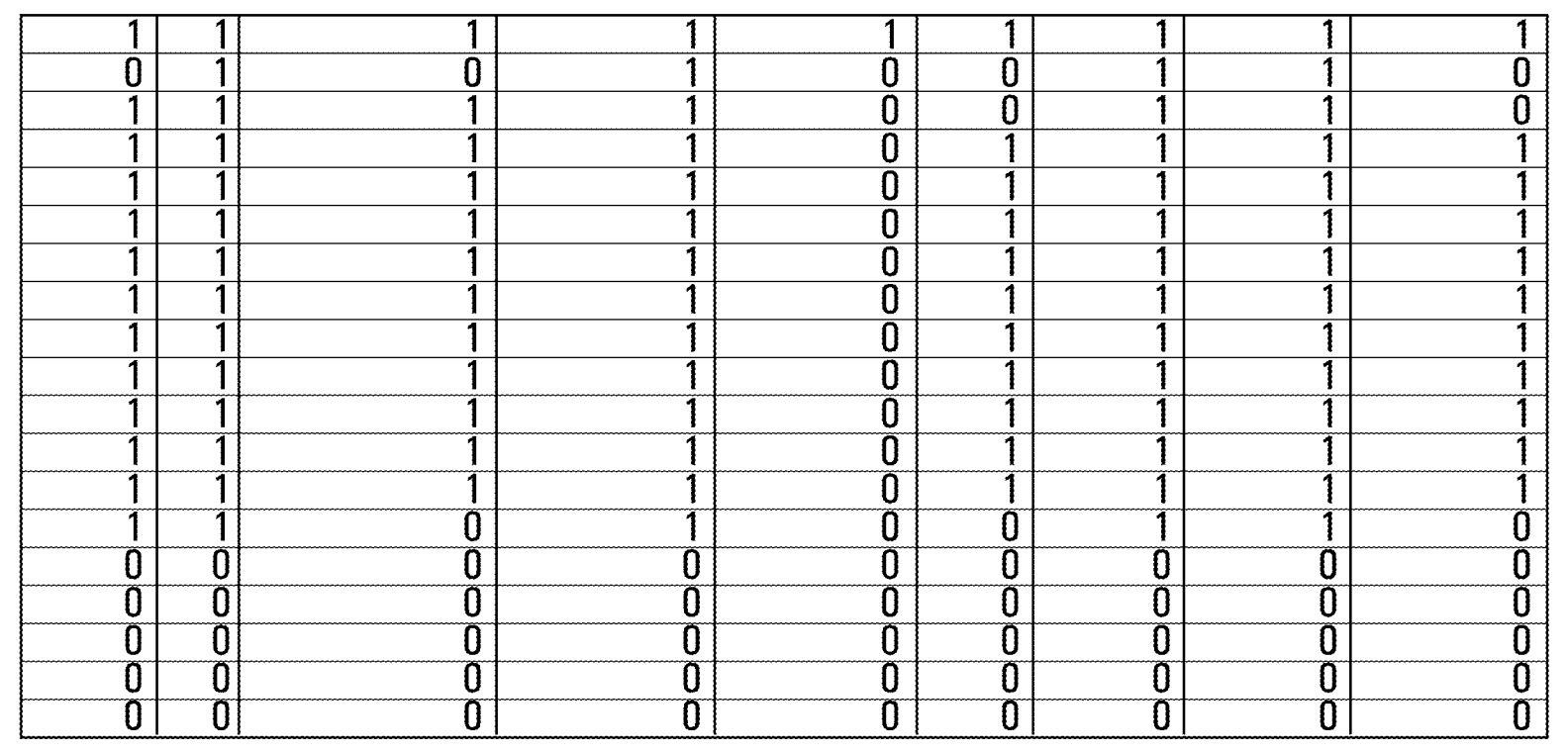

In some embodiments, the extracted feature set can then be represented by first converting the section characteristic table of FIG. 10 into a binary section characteristics table of 1s and 0s, such as the one shown in FIG. 11A. If a characteristic has a value of True, it can be set to 1 in the binary table, otherwise it can be set to 0. Then, the section names can be MinHashed to generate a vector of 128 integers. As a result, feature representation in accordance with the fifth exemplary branch results in the two feature vectors shown in FIGS. 11A and 11B.

Figure 12:
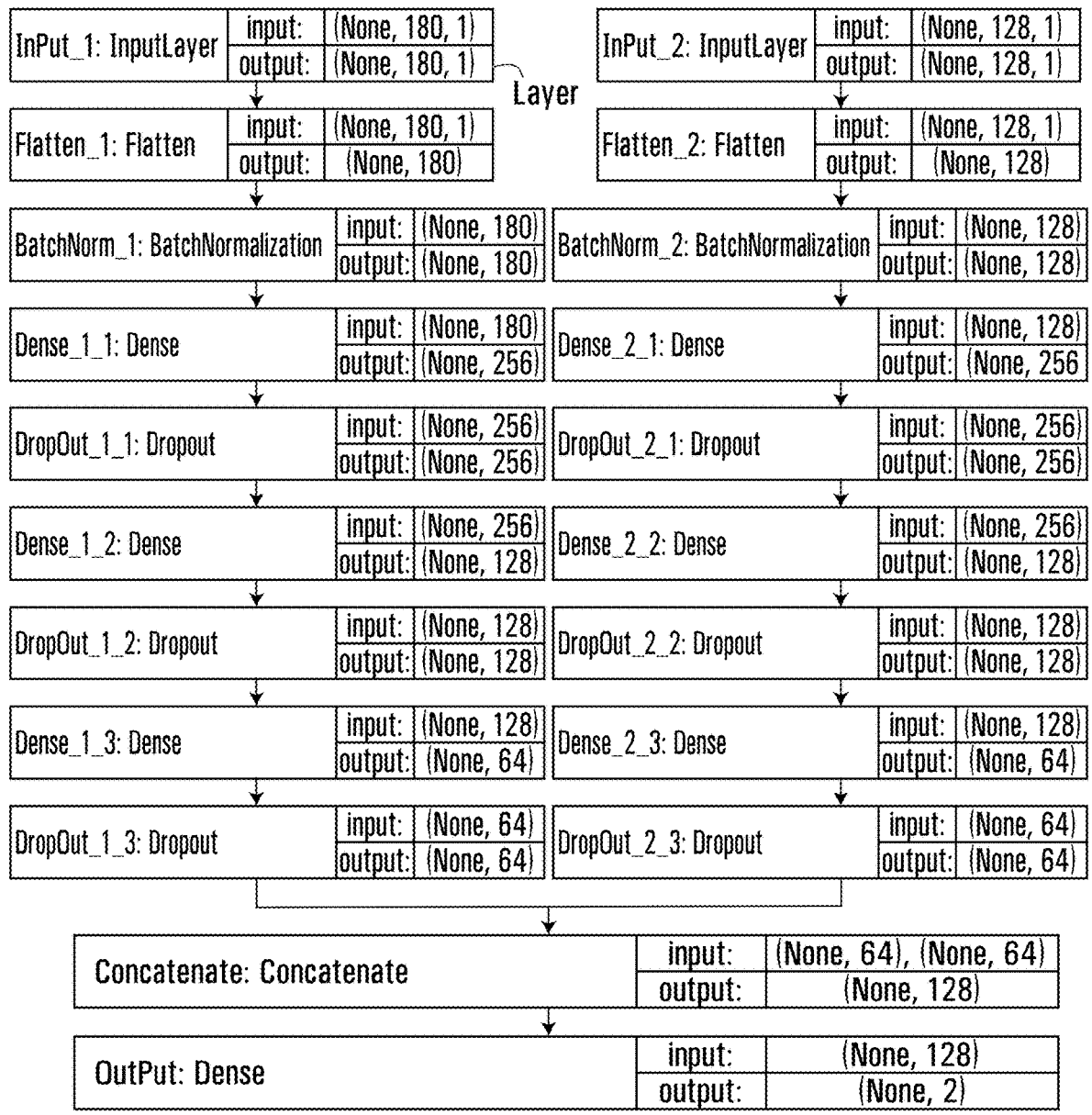
FIG. 12 is a schematic block diagram representing a multilayer perceptron DNN of a fifth exemplary branch of a multivariate ensemble DNN-based architecture in accordance with examples disclosed herein.

The represented feature vectors of the fifth exemplary branch can then be input into the fifth exemplary model shown in FIG. 12. As shown in FIG. 12, the fifth exemplary model itself comprises two branched, each having a plurality of layers (each block), each layer having inputs and outputs. As can be seen from FIG. 12, the size of the output of one layer will match the size of the input of the next layer, and so on. In the exemplary model shown in FIG. 12, each layer or each branch is one of an input layer, a dense layer, a dropout layer, a batch normalization layer or a flatten layer, each of which will, individually, be known to the skilled reader. The fifth exemplary model can comprise a concatenation layer for concatenating the outputs of the two branches, as shown in FIG. 12.

In some embodiments, a dataset of sample executable files can be used to train and test the fifth exemplary model. In some of such embodiments, the architecture of the fifth exemplary model shown in FIG. 12 can be trained using 80% of the samples in the dataset and tested using the remaining 20% of the samples. In an example of one such embodiment, the fifth exemplary model achieved a True Positive Rate (TPR) of 84.1% and a False Positive Rate (FPR) of 0.96%, as shown in FIG. 17.

With reference to FIGS. 13A and 13B, a sixth exemplary branch of the multivariate DNN-based architecture of FIG.

1 will now be described. The feature set corresponding the sixth exemplary branch comprises a plurality of printable strings and associated locations of each of the plurality of printable strings in the executable file. A printable string is a string type in the ASN.1 interface description language that relates to data that consists of a printable subset of the ASCII character set. In some embodiments, the string types can be categorized into the categories shown in FIG. 11A, namely General, Domain knowledge, Entropy and Length.

In some embodiments, each of the General strings shown in FIG. 11A are defined as follows:

string: the total number of strings.

noise: the total number of noise strings (strings with special symbols such as 'D$I'), regex=re.compile('[@!#$%^&*()"\'<>,\'?/\|]{~:†=\+\-\[†]]') is used to search noise strings

English sentence: the total number of English sentences, enchant,checker.SpellChecker is applied to search English sentences. In some embodiments, other languages could be used.

repeated character: the total number of strings which are all same characters such as "00000000", since entropy of each string will be calculated later, the strings with entropy of 0 can be defined as repeated characters.

file extension: the total number of strings which have file extensions, such as *.dll, *.exe In some embodiment, each of the Domain knowledge strings shown in FIG. 11A are defined as follows:

The constants.json file from the open source tool stringsifter (https://github.com/fireeye/stringsifter) can be used as the domain knowledge dictionary to et the total number of specific strings.

winApi: the total number of windows API strings. In the dictionary, there are 28307 items related to windows API such as 'ACUIProviderInvokeUI', 'ADSIAbandonSearch', 'ADSICloseDSObject'. Each string in the PE file can be matched to the items to get the total number of windows API strings. This method can be applied to the following features, but with different items.

dll: the total number of DLL file strings.

common dll: the total number of DLL file strings which are in the common DLL dictionary. There are 32 items in the common DLL dictionary such as 'wowarmhw', 'xtajit', 'advapi32', 'advapi', 'clbcatq', 'combase'.

malware dll: the total number of DLL file strings which are in the malware DLL dictionary. There are nine items in the malware DLL dictionary such as 'wininet', 'bypassuacdll', 'dnsapi.

cpp: the total number of strings which are related with cpp. There are 236 items in the cpp dictionary such as 'get_file_size', '.xdata$x', 'Cast to smaller type causing loss of data'.

fun_mal: the total number of important functions which may be related with malwares. There are 330 items in the fun_mal dictionary such as 'AdjustTokenPrivileges', 'CallNextHookEx', 'CheckRemoteDebuggerPresent'.

pe_arti: the total number of strings related with PE artifacts. There are 12 items in the pe_artifacts dictionary such as 'ProductVersion', 'VS_VERSION_INFO', '!This program cannot be run in DOS mode.'.

language: the total number of language strings such as "English-United States" and "German". There are 245 items in the language dictionary.

date: the total number of strings related with date such as "Sunday" and "May". There are 33 items in the language dictionary.

blacklist: the total number of strings which are in the blacklist dictionary. There are 280 items in the blacklist dictionary such as 'project.thisdocument', 'microsoft office', 'microsoft word', 'worddocument', 'xmlhttp', 'summaryinformation'.

In some embodiments, each of the Entropy strings shown in FIG. 11A are defined as follows:

Scipy.stats.entropy can be used to calculate entropy of each string. Pandas.Dataframe.quantile is used to get Quantile 10 or 100.

Avg: the average of the strings' entropy.

Max: the maximum value of the strings' entropy.

Min: the minimum value of the strings' entropy.

Quantile 10 or 100: the decile or the percentile of the strings' entropy.

In some embodiments, each of the Length strings shown in FIG. 11A are defined as follows:

Avg: the average of the strings' length.

Max: the maximum value of the strings' length.

Min: the minimum value of the strings' length.

Quantile 10 or 100: the decile or the percentile of the string's length.

An example string statistics vector representation of the above-described example is shown in FIG. 13B.

As will be appreciated, the aforementioned feature representation provides a great deal of flexibility to add more string statistics features as more domain knowledge is acquired, thereby expanding the feature space even further.

Figure 14:
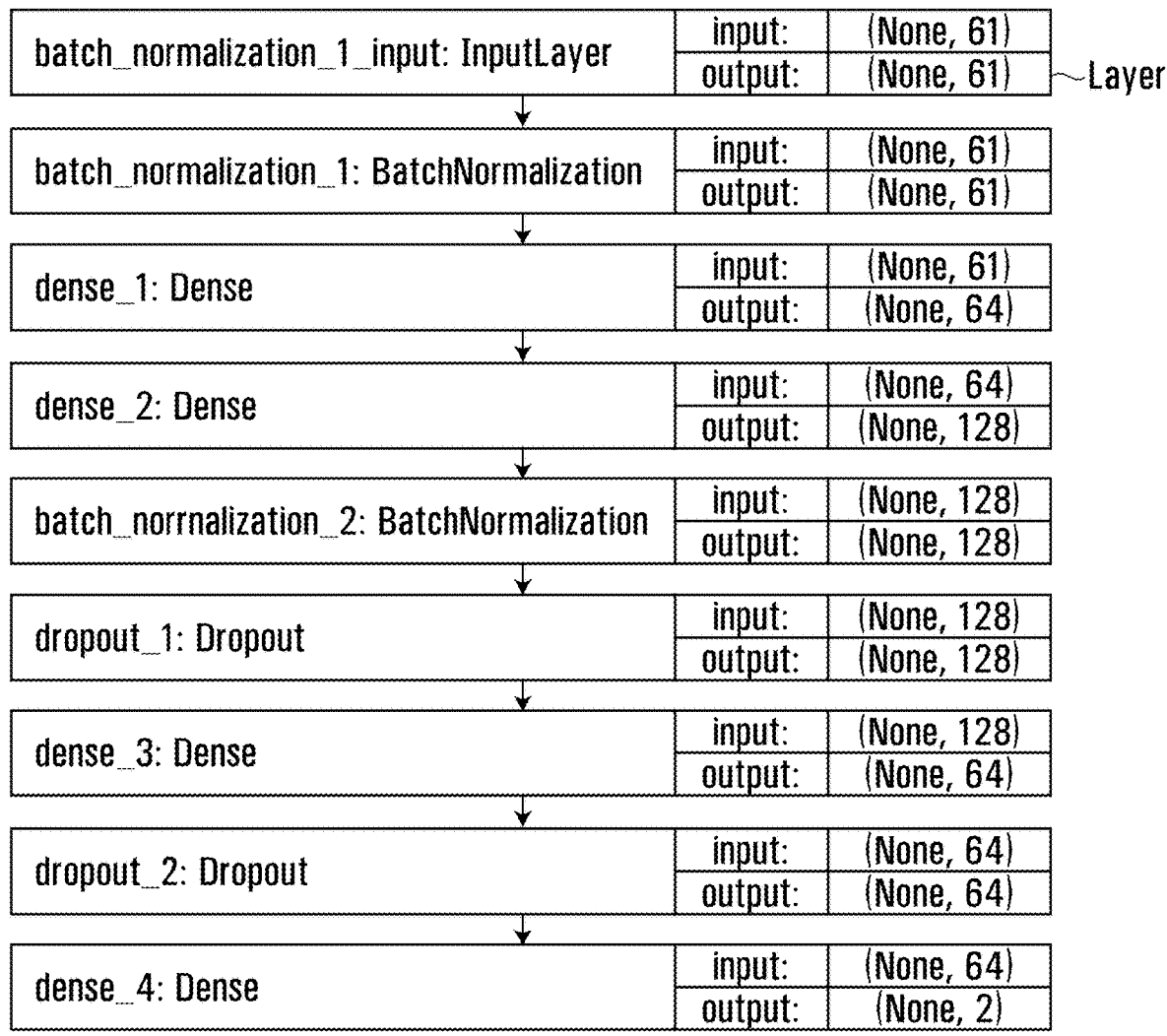
FIG. 14 is a schematic block diagram representing a multilayer perceptron DNN of a sixth exemplary branch of a multivariate ensemble DNN-based architecture in accordance with examples disclosed herein.

The represented feature set of the sixth exemplary branch can then be input into the sixth exemplary model shown in FIG. 14. As shown in FIG. 14, the sixth exemplary model comprises a plurality of layers (each block), each layer having inputs and outputs. As can be seen from FIG. 14, the size of the output of one layer will match the size of the input of the next layer, and so on. In the exemplary model shown in FIG. 14, each layer is one of an input layer, a dense layer, a dropout layer or a batch normalization layer, each of which will, individually, be known to the skilled reader.

In some embodiments, a dataset of sample executable files can be used to train and test the sixth exemplary model. In some of such embodiments, the architecture of the sixth exemplary model shown in FIG. 14 can be trained using 80% of the samples in the dataset and tested using the remaining 20% of the samples. In an example of one such embodiment, the fifth exemplary model achieved a True Positive Rate (TPR) of 83.52% and a False Positive Rate (FPR) of 1.0%, as shown in FIG. 17.

As will now be described with reference to FIGS. 15A and 15B, the aforementioned models can be combined to create the multivariate DNN-based architecture of FIG. 1. In some embodiments, combining the plurality of deep neural networks is achieved by concatenating the penultimate layer (i.e., the last hidden layer) of each DNN together, and then adding a fully connected layer to complete the multivariate ensemble DNN-based model. As will be appreciated by the skilled reader, other methods of combining the plurality of deep neural networks are possible and will be architecture dependent.

Figure 15A:
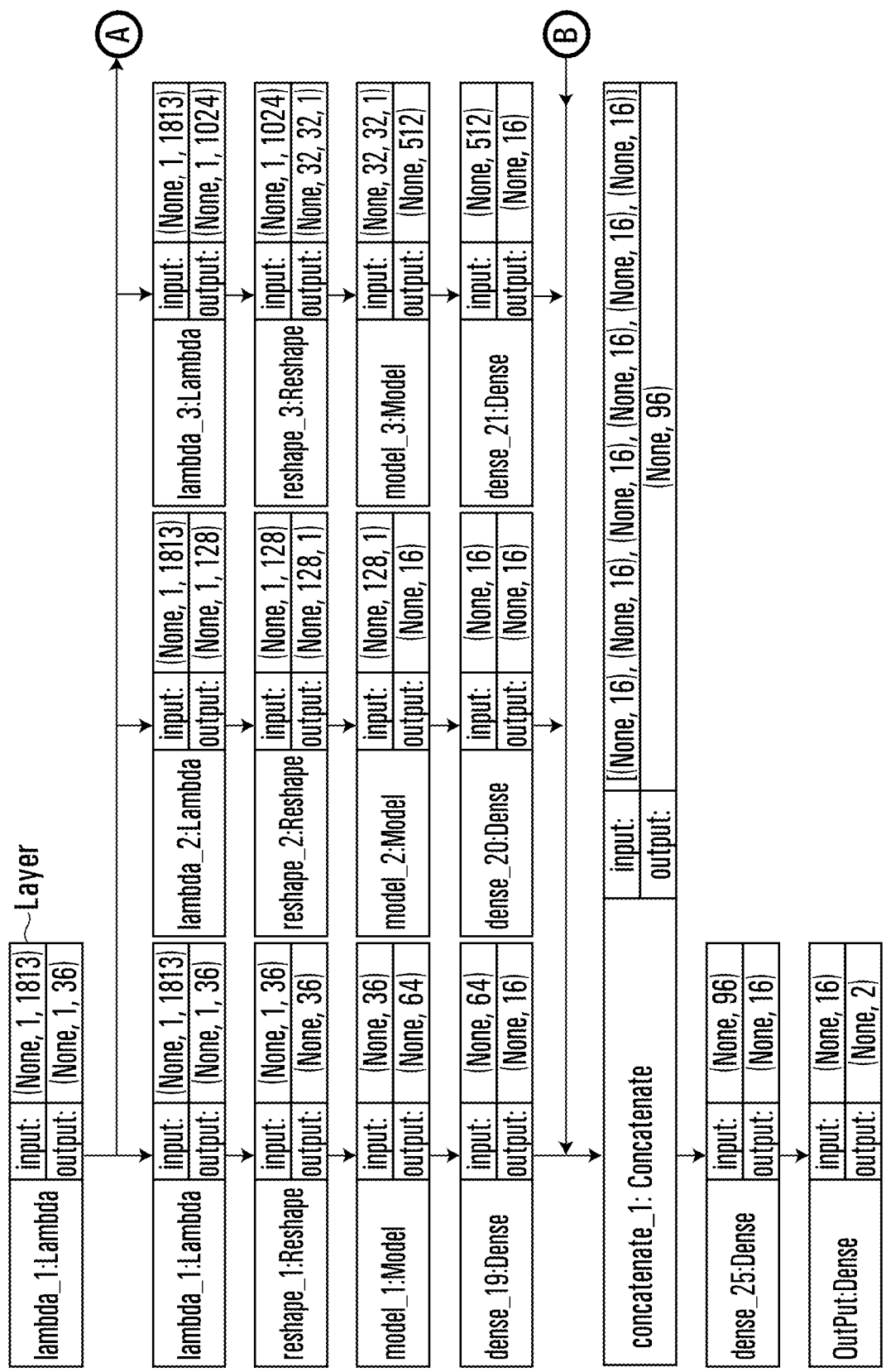
FIGS. 15A and 15B are a schematic block diagram representing an ensemble multivariate model in accordance with some embodiments of the present disclosure.
Figure 15B:
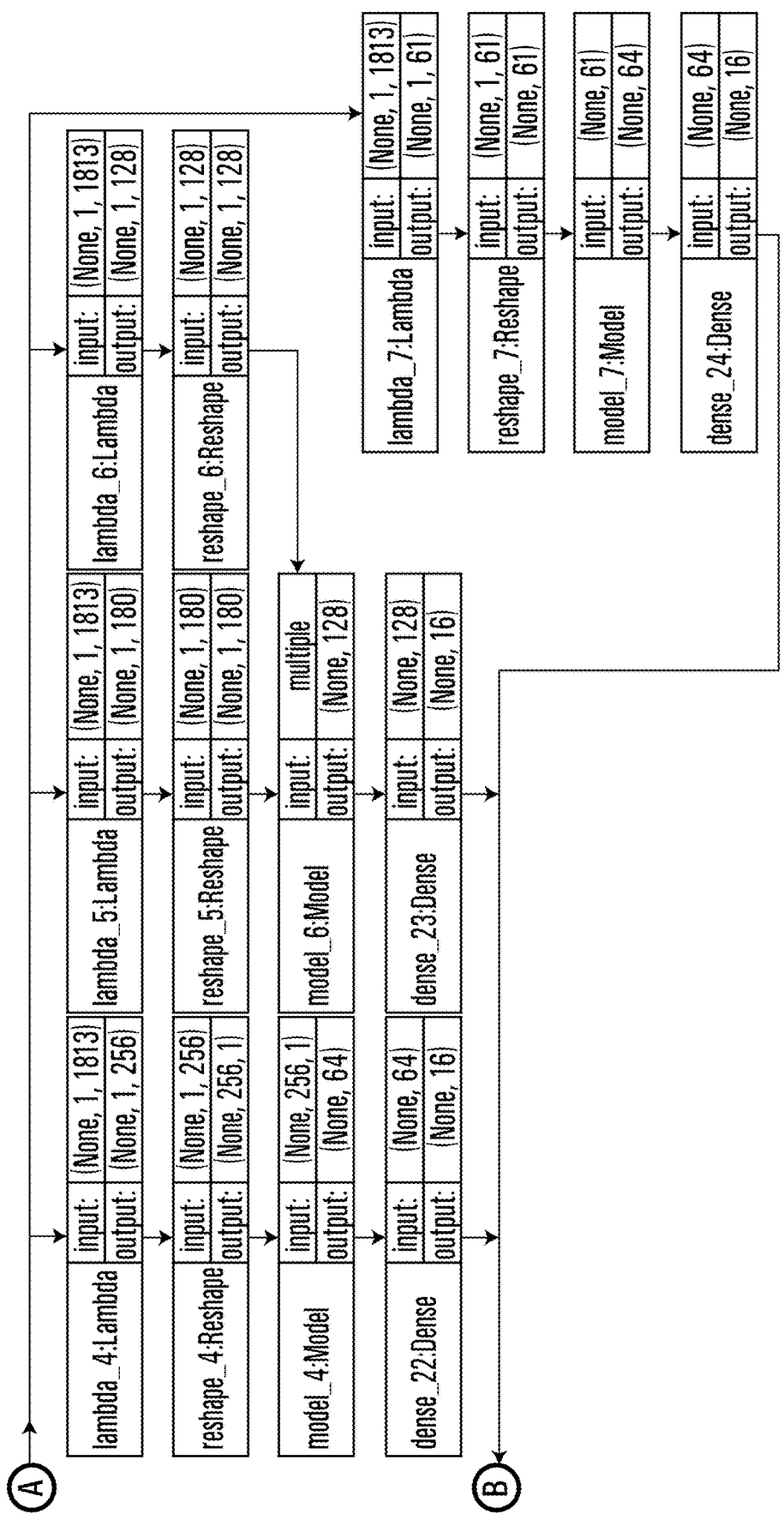

FIGS. 15A and 15B shows the six exemplary models described in detail above (i.e., model_1, model_2, model_3, model_4, model_5 and model_6) integrated into a single ensemble model. As shown in FIGS. 15A and 15B, the ensemble model comprises a plurality of layers (each block), each layer having inputs and outputs. As can also be seen from FIGS. 15A and 15B, the size of the output of one layer will match the size of the input of the next layer, and so on. In the exemplary model shown in FIGS. 15A and 15B, each layer is one of an input layer, a dense layer, a lambda layer, a concatenation layer or a reshape layer, each of which will, individually, be known to the skilled reader. The output of the multivariate ensemble DNN-based model is referred to herein as either a prediction or a detection, and can be interpreted to identify which executable files contain malware and which executable files do not contain malware. As such, the multivariate ensemble DNN-based model can either detect the presence of malware in an executable file by way of a prediction (e.g., the executable file is 82% likely to contain malware) or, when a predictive threshold is used to generate a binary output, by way of a detection (e.g., the model has detected malware).

Figure 16:
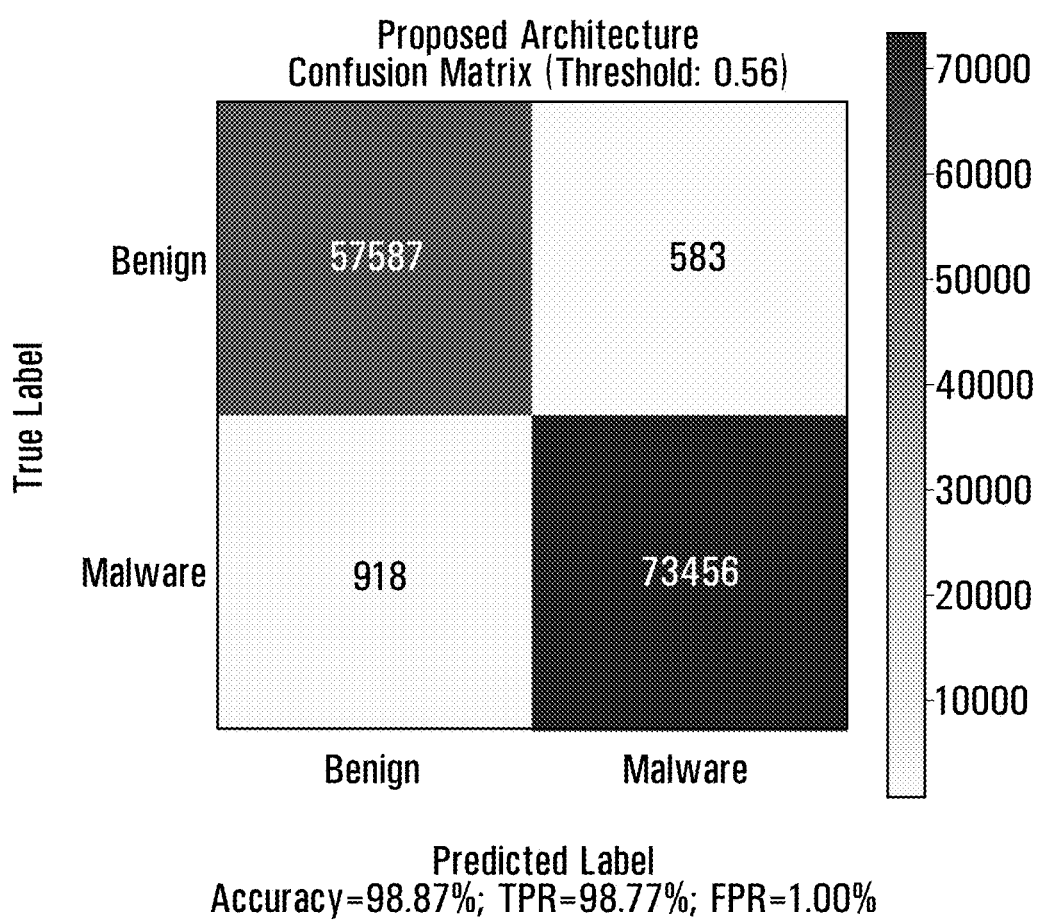
FIG. 16 is a representation of a confusion matrix relating to the ensemble multivariate model of FIGS. 15A and 15B.

In some embodiments, a dataset of sample executable files can be used to train and test the ensemble model of FIGS. 15A and 15B. In some of such embodiments, the architecture of the ensemble model shown in FIGS. 15A and 15B can be trained using 80% of the samples in the dataset and tested using the remaining 20% of the samples. In an example of one such embodiment, the ensemble model achieved a True Positive Rate (TPR) of 98.77% and a False Positive Rate FPR=1.0%, as shown in FIG. 17 and the ensemble model confusion matrix of FIG. 16.

The variety of feature sets associated with the ensemble model allows exploration of patterns in comparatively large representation space. As such, the ensemble model enables better space representation of a PE file. As will also be appreciated by the skilled reader, different feature extraction and feature representation processes that enable the ensemble DNN-based model of FIGS. 15A and 15B to perform effectively by achieving a very high True Positive Rate and a very low False Positive Rate, compared to known anti-virus (AV) solutions. As such, the methods and systems described herein will be particularly advantageous when used in the implementation of file-threat detection or stream-threat-detection in, for example, AI-enabled firewall software.

As will be appreciated by the skilled reader, any combination of two or more of the exemplary branches described herein can be combined to form one or more embodiments of the multivariate ensemble deep neural network methods and systems in accordance with the present disclosure.

Moreover, a person of skill in the art will readily recognize that steps of various aforementioned methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within the scope of the appended claims. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in FIG. 2, including the functional block labelled as "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative software and/or circuitry embodying the principles of the invention. Similarly, it will be appreciated that any flow charts, flow diagrams, state transition diagrams, pseudo code, and the like represent various processes which may be substantially represented in computer readable medium and so executed by a computer or processor whether or not such computer or processor is explicitly shown.

The invention claimed is:

1. A method comprising:
    receiving an executable file;
    extracting a plurality of feature sets from the executable file to generate a plurality of extracted feature sets, the plurality of feature sets relating to characteristics of the executable file, the plurality of feature sets comprise header information relating to parameters of the executable file, imported functions and libraries listed as being used by the executable file, a value of bytes located in a section containing an entry point of the executable file, characteristics of assembly language instructions of an entry function of the executable file, section characteristics of the executable file, and a plurality of printable strings and associated locations of each printable string of the plurality of printable strings in the executable file;
    representing the plurality of extracted feature sets in one or more corresponding feature spaces to generate a plurality of represented feature sets;
    inputting the header information, the imported functions and libraries, the value of the bytes, the characteristics of the assembly language instructions, the section characteristics, and the plurality of printable strings and the associated locations represented in the plurality of represented feature sets into inputs of a plurality of corresponding deep neural networks, wherein each of the header information, the imported functions and libraries, the value of the bytes, the characteristics of the assembly language instructions, the section characteristics, and the plurality of printable strings and the associated locations is input into a different deep neural network of the plurality of corresponding deep neural networks;
    combining the plurality of corresponding deep neural networks into a multivariate ensemble deep neural network; and detecting presence of malware in the executable file based on an output of the multivariate ensemble deep neural network.

2. The method of claim 1, wherein the extracting includes extracting a parameter feature set containing executable file parameters found in a header of the executable file to generate an extracted parameter feature set.

3. The method of claim 2, wherein the representing includes representing the extracted parameter feature set using one-hot-encoding to generate a represented parameter feature set.

4. The method of claim 3, wherein the inputting includes inputting the represented parameter feature set into the inputs of a multilayer perceptron.

5. The method of claim 1, wherein the executable file is a portable executable (PE) file, and wherein the parameters include one or more of PE file parameters: MajorSubsystemVersion, Machine, MajorOperatingSystemVersion, MinorLinkerVersion, or Subsystem.

6. The method of claim 1, the combining comprising concatenating a last hidden layer from each deep neural network of the plurality of corresponding deep neural networks.

7. A system comprising:
at least one processor; and
at least one non-transitory memory containing instructions which when executed by the at least one processor cause the system to perform:
receiving an executable file;
extracting a plurality of feature sets from the executable file to generate a plurality of extracted feature sets, the plurality of extracted feature sets relating to characteristics of the executable file, the plurality of extracted feature sets comprise header information relating to parameters of the executable file, imported functions and libraries listed as being used by the executable file, a value of bytes located in a section containing an entry point of the executable file, characteristics of assembly language instructions of an entry function of the executable file, section characteristics of the executable file, and a plurality of printable strings and associated locations of each printable string of the plurality of printable strings in the executable file;
representing the plurality of extracted feature sets in one or more corresponding feature spaces to generate a plurality of represented feature sets;
inputting the header information, the imported functions and libraries, the value of the bytes, the characteristics of the assembly language instructions, the section characteristics, and the plurality of printable strings and the associated locations represented in the plurality of represented feature sets into inputs of a plurality of corresponding deep neural networks, wherein each of the header information, the imported functions and libraries, the value of the bytes, the characteristics of the assembly language instructions, the section characteristics, and the plurality of printable strings and the associated locations is input into a different deep neural network of the plurality of corresponding deep neural networks;
combining the plurality of corresponding deep neural networks into a multivariate ensemble deep neural network; and
detecting presence of malware in the executable file based on an output of the multivariate ensemble deep neural network.

8. The system of claim 7, wherein the extracting includes extracting a parameter feature set containing executable file parameters found in a header of the executable file to generate an extracted parameter feature set.

9. The system of claim 8, wherein the representing includes representing the extracted parameter feature set using one-hot-encoding to generate a represented parameter feature set.

10. The system of claim 9, wherein the inputting includes inputting the represented parameter feature set into the inputs of a multilayer perceptron.

11. The system of claim 7, wherein the executable file is a portable executable (PE) file, and wherein the parameters include one or more of PE file parameters: MajorSubsystemVersion, Machine, MajorOperatingSystemVersion, MinorLinkerVersion, or Subsystem.

12. A non-transitory computer-readable medium having instructions stored thereon that, when executed by a system, cause the system to perform operations, the operations comprising:
receiving an executable file;
extracting a plurality of feature sets from the executable file to generate a plurality of extracted feature sets, the plurality of extracted feature sets relating to characteristics of the executable file, the plurality of extracted feature sets comprise header information relating to parameters of the executable file, imported functions and libraries listed as being used by the executable file, a value of bytes located in a section containing an entry point of the executable file, characteristics of assembly language instructions of an entry function of the executable file, section characteristics of the executable file, and a plurality of printable strings and associated locations of each printable string of the plurality of printable strings in the executable file;
representing the plurality of extracted feature sets in one or more corresponding feature spaces to generate a plurality of represented feature sets;
inputting the header information, the imported functions and libraries, the value of the bytes, the characteristics of the assembly language instructions, the section characteristics, and the plurality of printable strings and the associated locations represented in the plurality of represented feature sets into inputs of a plurality of corresponding deep neural networks, wherein each of the header information, the imported functions and libraries, the value of the bytes, the characteristics of the assembly language instructions, the section characteristics, and the plurality of printable strings and the associated locations is input into a different deep neural network of the plurality of corresponding deep neural networks;
combining the plurality of corresponding deep neural networks into a multivariate ensemble deep neural network; and
detecting presence of malware in the executable file based on an output of the multivariate ensemble deep neural network.

* * * * *